Aug. 22, 1950  A. RAFTER  2,520,013
CLUTCH MECHANISM
Filed April 24, 1946  2 Sheets-Sheet 2
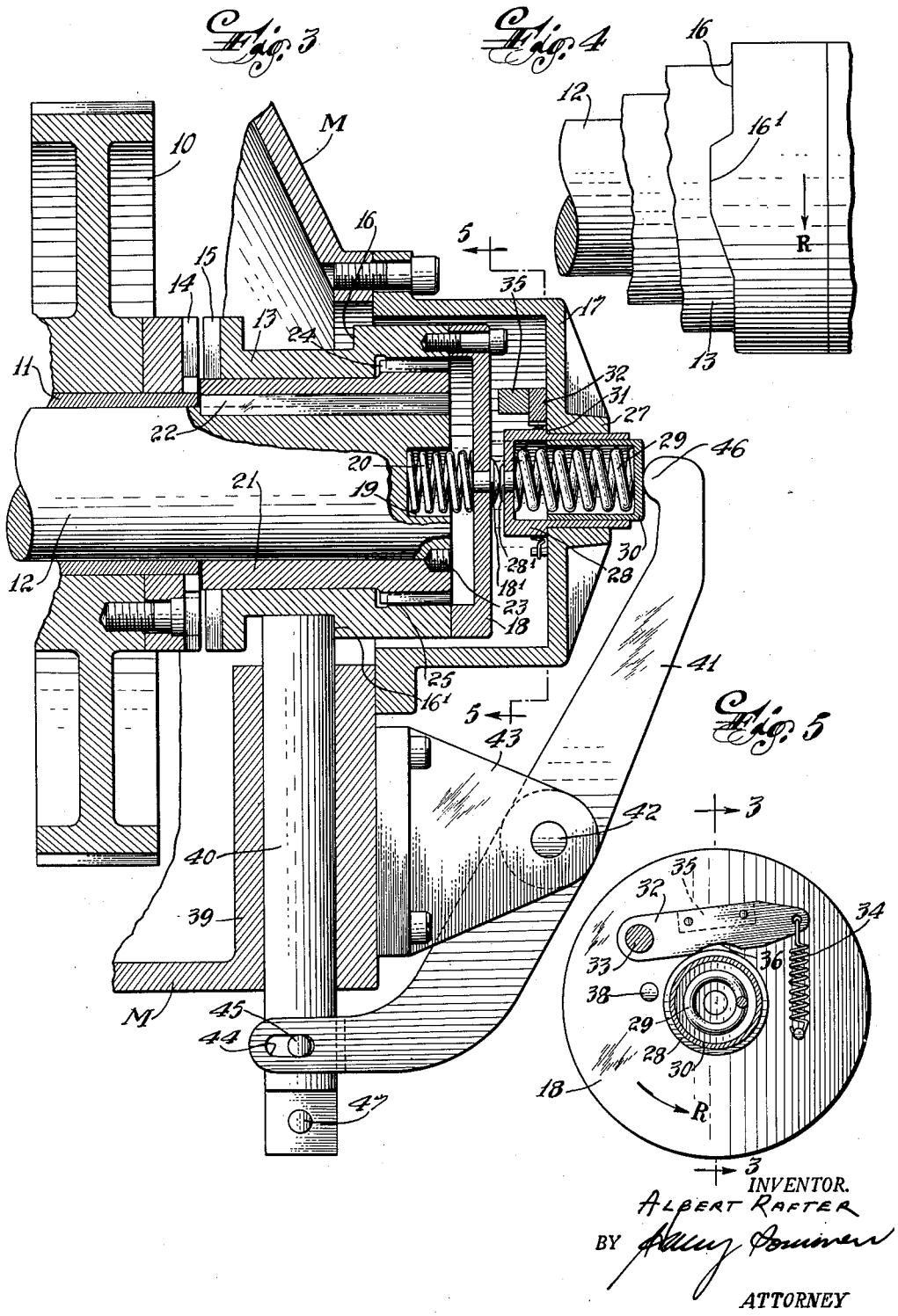
INVENTOR.
ALBERT RAFTER
BY
ATTORNEY Patented Aug. 22, 1950

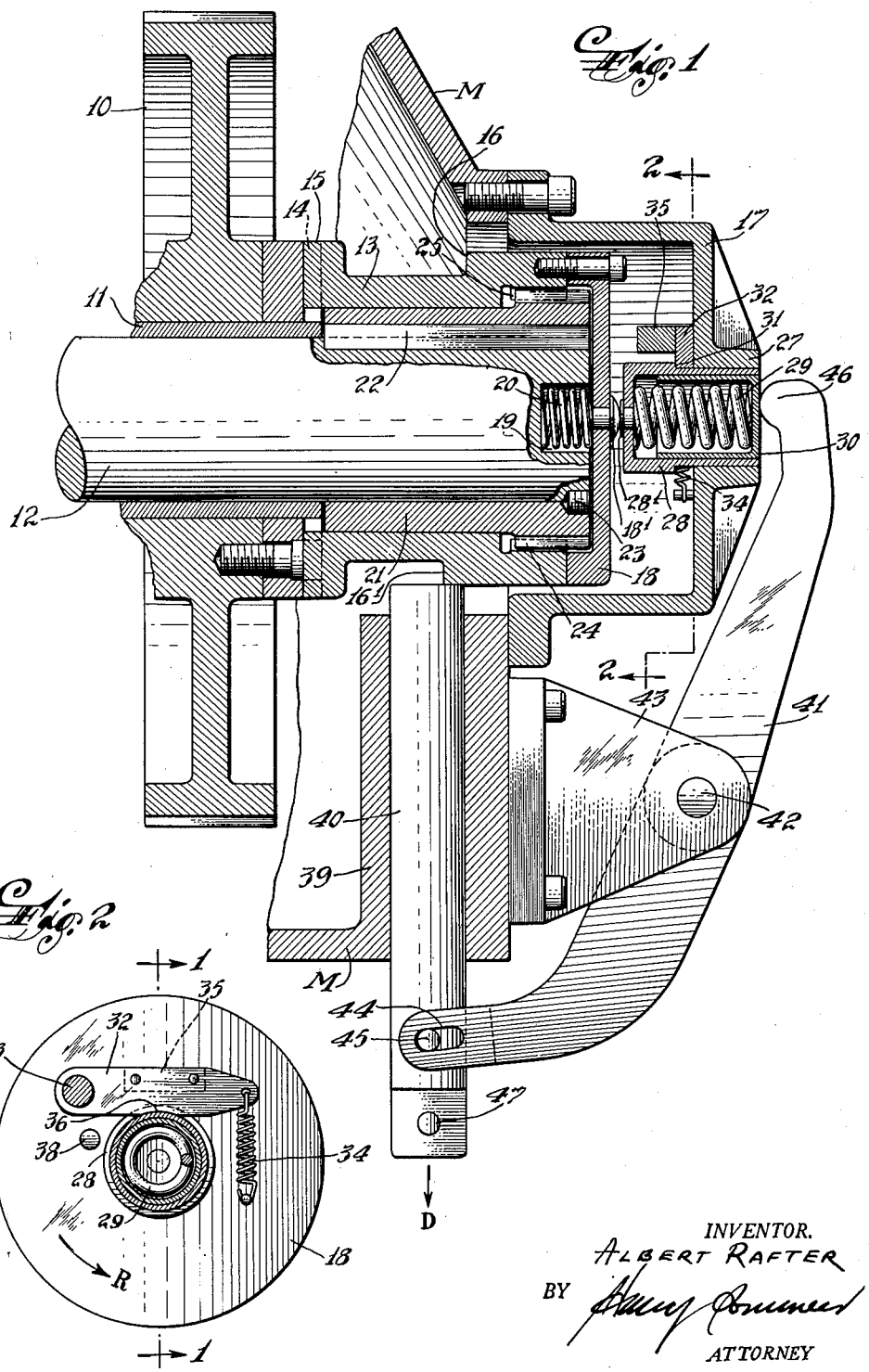

2,520,013

UNITED STATES PATENT OFFICE 2,520,013

CLUTCH MECHANISM

Albert Rafter, Glen Ridge, N. J., assignor to Rafter Machine Company, Belleville, N. J., a partnership composed of Albert Rafter and John C. Rafter, Jr.

Application April 24, 1946, Serial No. 664,644

15 Claims. (Cl. 192—33)

This invention relates to improvements in clutches and similar devices for coupling a driving member to a driven member.

In clutches heretofore used in presses, for example, it has been noted that the engagement and disengagement of the clutch is frequently accompanied by "chattering." This is due to the fact that the engagement and disengagement of the parts are frequently not positive operations. In some cases the lack of positive action is so pronounced that the clutch continues engagement for a time past the calculated time. Where, for example, in operation of machinery, the operator assumes that the clutch is disengaged, severe injury often results due to the unexpected continued engagement of the clutch.

The invention herein disclosed was designed to overcome the deficiencies above noted. This end is attained by so designing the clutch that the same will be accurate and positive in engagement and disengagement and smooth, efficient and reliable in operation.

It will be apparent from the foregoing and from the description hereinafter considered in conjunction with the accompanying drawings, that the invention is broadly applicable to any mechanism utilizing a clutch or similar member.

The drawings illustrate by way of example but not in limitation, the application of the invention to a clutch associated with a driving member and a driven shaft such as are commonly used in presses and similar machinery. From this illustration of one embodiment of the invention, it will be apparent that the invention is equally applicable to other mechanisms.

The foregoing and other advantageous objects, which will later appear, are accomplished by the structure shown and illustrated in the accompanying drawings, wherein:

Fig. 1 is a fragmentary vertical elevational view, partly sectional, of a clutch embodying my invention, in its positive engaged position, taken on line 1—1 of Fig. 2, Fig. 2 is a horizontal, fragmentary, partly sectional view, taken on line 2—2 of Fig. 1, Fig. 3 is a view taken on line 3—3 of Fig. 5, generally corresponding with Fig. 1 but showing the parts in the clutch released position, Fig. 4 is a fragmentary elevational view of parts of the device correspondingly numbered in the other views, and Fig. 5 is a horizontal, fragmentary, partly sectional view taken on line 5—5 of Fig. 3.

Referring more particularly to the drawings, the clutch is shown associated with a power source 10, which may be the power source of any mechanism (for the purpose of illustration, the power source is shown as a driving gear 10). The member to be driven thereby (which may be any driven shaft or other part of the mechanism between which and the power source the clutch of my invention may be used) is shown as a driven shaft 12 journalled in a bearing or sleeve 11. The sleeve 11 may be fixed to the machine or otherwise associated with the driving member 10 of the machine so as to permit the driving member 10 to be rotated on the sleeve 11 while the driven shaft 12 may rotate independently within the sleeve, which thus also serves as a bearing therefor. The clutch is generally designated by the numeral 13 and is shown in the drawings as comprising a generally tubular, hollow member, provided at one end thereof with a gear ring 15 which may be integral therewith or secured thereto in any desired or convenient manner. The other end of the clutch 13 has a cover plate 18 fixed thereto or formed integral therewith. Intermediate the ends 15 and 18 thereof, the clutch member is provided with a circumferentially recessed portion defined by a circumferential ledge 16 which is generally continuous throughout the circumference of the clutch member except for a portion 16' thereof which is extended to depend therefrom to define a cam surface. The driven shaft 12 is fixed at the end thereof which is indicated in the drawing as a broken end to a mechanism to be driven in the usual manner. The free end of said shaft is provided with a recess 19 for the reception of releasing spring 20 which is thus interposed between the shaft and the cover plate 18 of the clutch 13 to urge the clutch away from the driving member 10 so that the gear face 15 of the clutch will be released or spring urged out of meshing engagement with the complementary gear ring 14 integral with or otherwise secured to the driving member 10. The driving hub 21 is fixed to the driven shaft 12 as by key 22 and bolt means 23. The hub 21 and the clutch 13 are provided with complementary interengaging spline or similar members 24 and 25 so that the clutch will have constant axial sliding engagement or slidable keying action with the driving hub 21 while united with or engaged thereto for rotation in unison therewith. A housing 17 is fixed to the machine frame M in any desired or convenient manner in spaced relation to the cover plate 18 of the clutch member, said housing being provided with a medial open boss 27 to axially slidably receive the cup member 28 which receives the engaging spring 29, the latter being preferably a stronger spring than the release spring 20. Cap member 30 is superimposed over the spring 29 and is telescopically received within the cup member 28. By this arrangement, as will be noted from an examination of Figs. 1 and 3, the spring 29 will be confined within the cup 28 by cap member 30 which is slidably disposed in cup 28. The cup 28 is provided with a circumferential shouldered portion 31 adapted to engage the underside of the medial boss 27 of the housing 17. A locking lever 32 is pivoted at 33 to the underside of the cap 17, the other end of the lever being normally urged toward the member 28 by spring means 34. A release plate 35 is fixed to the underside of said lever. The lever 32 is provided with a medial arced recess 36 to enable the lever to be moved into smooth circumferential engagement with the cup member 28 responsive to the spring 34 (see Figs. 1 and 2). The cup member 28 and the cover plate 18 of the clutch member are provided with medial studs 28', 18' adapted to have abutting contact as shown in Figs. 1 and 3. Release pin 38 is fixed to the cover plate 18 so that in the rotation of the latter in the direction indicated by the arrows R (Figs. 2, 4 and 5) said pin will be carried into the path of the release plate 35 of the lever 32. The release plate 35 is secured to the lever 32 and disposed downwardly at right angles to the general plane thereof so that it will be in the plane of rotated pin 38 for displacing the lever 32 and withdrawing the same from the shouldered portion 31 of the cup member 28. The engaged position of the lever is shown in Fig. 1 and in its disengaged position in Fig. 3. A bearing 39 is fixed to the machine frame M, said bearing being adapted to slidably receive the cam rod 40, in alignment with the ledge 16 of the clutch. Engaging lever 41 is pivoted medially as at 42 in a support 43 fixed to the machine frame M or to the bearing 39 or to any other suitable support. The lever 41 is provided at one end with an elongated slot 44 to receive the pin 45 on the cam rod 40; other interengaging means may be substituted if desired. The other end of the lever is angularly directed to define a rounded finger 46 which abuts the cap member 30.

The structure described above is adapted to provide for the positive engagement of the clutch (and, thereby the driven shaft splined thereto) with the power source 10 for rotation in unison therewith, when the cam rod 40 (which may be connected at 47 to a treadle or other actuating means) is moved as indicated by the arrow D in Fig. 1. The structure assures one complete revolution of the driven shaft 12 responsive to movement of the cam rod 40. Thus, for example, in the use of the clutch on presses, the press operator, by actuating the cam rod 40 in the direction D will shift the parts from the position indicated in Fig. 3, which is the positive release position, to the position shown in Fig. 1, which is the positive engage position. The clutch 13, in the position shown in Fig. 1 will be positively engaged with the member 10 and will rotate from that position to the position shown in Fig. 3, in the direction indicated by the arrows R in Figs. 2, 4 and 5.

In the revolution of the shaft 12, the release pin 38 will be carried into engagement with the release plate 35 to displace the lever 32 from the position shown in Fig. 1 in which said lever is in locking registry with the shoulder 31 of the cup member 28, and cam surface 16' engages rod 40, displacing the clutch 13 from the flywheel 10 and returning the parts to the release position as shown in Fig. 3.

The sequence of operation is:

The rod 40 is normally held in the position shown in Fig. 3, under the cam surface 16' of the ledge 16 of the clutch 13, the cap 30, urged by spring 29 acting on the lever 41 to hold the rod 40 engaged. When it is desired to rotate the clutch to drive the member 12 for one complete revolution, the rod 40 is moved in the direction of the arrow D, Fig. 1, withdrawing the rod from the undersurface of the cam surface 16' and to a position against the outer walls of the clutch 13 (Fig. 1). This movement of rod 40 rocks the lever 41 so that the end 46 thereof will move the cup 28 against the plate 18 of the clutch, correspondingly moving the clutch 13 into mesh with wheel 10. In the described operation, the spring 29 will have been compressed (see Fig. 1). Locking lever 32 engages the shouldered portion 31 of the cup 28 to automatically lock the clutch in engaged position. On rotation of the clutch, the extended cam surface 16' thereof clears the rod 40 and the latter moves under the ledge 16.

The clutch rotates with the lever 32 engaging shouldered portion 31 of cup 28 in the position shown in Fig. 1 until the release pin 38, carried by the rotating clutch, strikes the plate 35 of the lever 32 to displace the latter from cup 28, as shown in Figs. 3 and 5. Thereupon, responsive to the spring 20, which is then permitted to expand, the clutch is shifted as shown in Fig. 3, sufficient to disengage the same from wheel 10. The spring 29 urges the rod 40 to a position of re-insertion under the ledge 16' responsive to the rocking of the lever 41 and spring 29, with the result that the clutch ledge 16', riding on rod 40, fully disengages the clutch, which stops rotating. That point marks the end of one complete cycle and the beginning point of the next cycle, the latter being initiated when the rod is once again moved in the direction of the arrow D, Fig. 1.

From the foregoing, it will be apparent that the structure described assures the positive engagement of the clutch with the power source 10 for one complete revolution of the driven shaft 12 responsive to the actuation of the cam rod 40, assuring the continued engagement of said clutch and power source for the completion of the revolution of the shaft 12, whereupon the clutch is positively released from the power source 10 and cannot accidentally continue in engagement therewith. It will be apparent that the structure is adapted for manual or automatic operation responsive to the displacement of the cam rod 40 by manual or automatic means. The clutch 13 and power source 10 may be provided with any other desired interengaging means in lieu of the meshing teeth 14, 15 within the purview of this invention. It will be further apparent that other modifications of the structure are possible, such as, for example, the substitution of hydraulic or other expansible or reciprocating means in place of the springs 19, 29; the substitution of other interengaging means between the cup 28 and housing 17 to be displaced responsive to the rotation of the clutch, and substitution of other means than rod 40, cam surface 16', and pivoted lever 41 to engage the clutch with the power source 10, within the purview of this invention and within the scope of the appended claims.

From the foregoing description, it will be seen that pursuant to my invention there is provided a clutch 13 for connecting a driven member 12 to a power source 10, interengaging faces 15, 14, on said clutch member and said power source to rotate the same in unison, means to slidably, axially key the clutch and driven member together, expansible means 20 between the clutch member and driven member urging the clutch member away from the power source, a second expansible means 29 of greater force than the first mentioned expansible means engaging the clutch member and urging the latter toward the power source for engagement therewith in opposition to the first mentioned expansible means 20, means to hold the second expansible means in a position of engagement with the clutch member to urge the latter into engagement with the power source, and means to release the second expansible means from said position so that the clutch will be disengaged from the power source responsive to the first mentioned expansible means.

The release plate 32, engaging the holder 28 for spring 29, latches the holder against the clutch plate until the release pin 38 displaces the latch or release plate 32 from the holder 28. The clutch 13 connects members 12 and 10 which may be the power source and driver member, or vice versa; the clutch may be applied intermediate any two other members to be connected, within the scope and purview of my invention.

While I have shown in the drawings and described in the above specification, a convenient form of structure embodying my invention, it will be apparent from such disclosure that the invention is capable of many modifications without departing from the spirit and scope thereof, as set forth in the appended claims.

Having thus described my invention what I claim as new and desire to secure by Letters Patent, is:

1. In a clutch mechanism for connecting a driven member to a power source, a tubular clutch member, interengaging faces on said clutch member and said power source to rotate the same in unison, means to slidably, axially key the clutch and driven members together, expansible means between the clutch member and driven member urging the clutch member away from the power source, a second expansible means of greater force than the first mentioned expansible means, engaging the clutch member and urging the latter toward the power source for engagement therewith in opposition to the first mentioned expansible means, holding means to hold the second expansible means in a position of engagement with the clutch member to urge the latter into engagement with the power source, and means engaging said holding means to release the second expansible means from said position on rotation of the clutch so that the clutch will be disengaged from the power source responsive to the first mentioned expansible means.

2. In a clutch mechanism for connecting a driven member to a power source, a tubular clutch member, interengaging faces on said clutch member and said power source to rotate the same in unison, means to slidably, axially key the clutch and driven members together, expansible means between the clutch member and driven member urging the clutch member away from the power source, a second expansible means of greater force than the first mentioned expansible means, engaging the clutch member and urging the latter toward the power source for engagement therewith in opposition to the first mentioned expansible means, a holder for said second expansible means, a latch to latch the holder against the clutch plate to hold the clutch in engagement with the power source, and means to displace the latch and thereby release the second expansible means from said position so that the clutch will be disengaged from the power source responsive to the first mentioned expansible means.

3. In a clutch mechanism for connecting a power source to a member to be driven thereby, a tubular clutch member, a circumferential ledge having an extended cam surface on said clutch member, complementary means on said clutch member and on said power source for rotation of the clutch in unison with the power source, means between the driven member and clutch to slidably axially key the clutch and driven members together, a first expansible member between the clutch and driven member to urge the clutch away from the power source, a second expansible member engaging the clutch to urge the latter toward the power source for engagement therewith in opposition to the action of the first mentioned expansible member, said expansible members being disposed in concentric alignment with the axial plane of said clutch, and means in engagement with said second expansible member and ledge, movable in one direction to compress the said expansible member to move the clutch into engagement with the power source against the resistance of the first mentioned expansible member.

4. In a clutch mechanism for connecting a power source with a member to be driven thereby, a tubular clutch member, means between said member and the driven member to axially slidably key the clutch thereto, expansible means interposed between the driven member and clutch to release the latter from the power source, a cam on said clutch, a second expansible member, and means engaging said second expansible member and said cam of the clutch to cam said clutch to released position away from the power source at the completion of one revolution of said driven member when said engaging means are moved in one direction.

5. In a clutch mechanism for connecting a power source with a member to be driven thereby, a tubular clutch member, means between said member and the driven member to axially slidably key the clutch thereto, a plate fixed to said clutch, means interposed between the driven member and said plate to urge the latter and thereby the clutch away from the power source, cam engaging means on said clutch, and means engaging said plate and the cam means of the clutch to cam said clutch to released position away from the power source at the completion of one revolution of said driven member when said engaging means are moved in one direction.

6. In a clutch mechanism for connecting a power source with a member to be driven thereby, a tubular clutch member, means between said member and the driven member to axially slidably key the clutch thereto, a plate on said clutch, means interposed between the driven member and said plate to urge the latter and thereby the clutch away from the power source, cam means on said clutch, engaging means engaging said plate and the cam of said clutch to cam said clutch to released position away from the power source at the completion of one revolution of said driven member when said engaging means are moved in one direction and to move the clutch into engagement with the power source for rotation of said driven member for another complete revolution when said engaging means are moved in the opposite direction.

7. In a clutch mechanism for connecting a power source to a member to be driven thereby, a tubular clutch member, means on said member adapted to engage the power source to connect the same thereto for rotation in unison therewith, a hub keyed to said driven member, means on said clutch and hub to axially key the clutch to the hub while constantly engaged therewith, a circumferential ledge on said clutch, a cam surface depending from said ledge, a rod, means aligning said rod with said ledge, expansible means engaging said clutch, and means between the rod and the expansible means to compress said expansible means to urge the clutch into engagement with the power source on movement of the rod in one direction.

8. In a clutch mechanism for connecting a power source to a member to be driven thereby, a tubular clutch member, means on said member adapted to engage the power source to connect the same thereto for rotation in unison therewith, a hub keyed to said driven member, means on said clutch and hub to axially key the clutch to the hub while constantly engaged therewith, a circumferential ledge on said clutch, a cam surface depending from said ledge, a rod, means aligning said rod with said ledge, a lever, expansible means between said clutch and one end of said lever, and means connecting the other end of the rod to the lever to move the rod in one direction into registry with the clutch ledge to thereby displace the clutch from the power source when the clutch cam engages said rod and to move the clutch into engagement with the power source when said rod is moved in the other direction.

9. In a clutch mechanism for connecting a power source to a member to be driven thereby, a clutch member, complementary means on one end of said clutch member and on said power source for rotation of the clutch in unison with the power source, means between the driven member and clutch to axially slidably key the clutch to said driven member, and expansible means between the clutch and driven member to urge the clutch away from the power source to disengage the same therefrom, a second expansible member engaging the clutch to urge the latter into engagement with the power source in opposition to the action of the first mentioned expansible member, and lever means engaging said second expansible member to compress the latter to move the clutch into engagement with the power source against the resistance of the first mentioned expansible member, a release member on said clutch, and a complementary release member engaging said second expansible member for displacing the release member from the second expansible means in the course of rotation of the clutch, and to preclude displacement of the clutch from the power source until said release members are in engagement.

10. In a clutch mechanism for connecting a power source to a member to be driven thereby, a clutch member, means at one end of said clutch adapted to engage the power source for rotation in unison therewith, a hub, means to secure said hub to said driven member, interengaging means on said clutch and hub for constant axial, slidable engagement of the clutch with the hub, a circumferential ledge on said clutch, a cam surface depending from said ledge, a rod, a bearing aligning said rod with said ledge, a lever, tension means between said clutch and one end of said lever, and interengaging means on the rod and lever connecting the other end of the rod to the lever, so that said tubular member may be moved toward the power source and into engaged position therewith when the rod is moved in the bearing away from the tubular member and may be moved away from the power source and disengaged from the power source when the rod engages the cam of the tubular member in the rotation of the latter after its said engagement with the power source.

11. In a clutch mechanism for connecting a driven member to a power source, a clutch member, means to connect the clutch member to the driven member, a cam surface on said clutch member, a rod, a lever pivoted to said mechanism, means to connect one end of said rod to said lever, and expansible means between the other end of said lever and said clutch constantly engaged by said other end of said lever and by said clutch member whereby, when said lever is pivoted in one direction, the rod will be moved into position for engagement with the cam surface of said clutch to cam the clutch out of engagement with the power source, and, when the lever is pivoted in the other direction, the rod will be moved out of said position and the clutch will be moved into engagement with the power source.

12. In a mechanism for connecting a clutch having a cam surface to a power source, a pivoted lever, means engaging one end of said lever and adapted to engage the cam surface of the clutch, whereby, when said lever is pivoted in one direction, the said means will be moved into position for engagement with the cam surface to move the clutch out of engagement with the power source, and expansible means between and in constant engagement with both the second end of said lever and said clutch and providing a connection therebetween, whereby, when said lever is pivoted in an opposite direction, said lever will move the expansible means against the clutch, to move said clutch into engagement with the power source.

13. In a mechanism for connecting a clutch having a cam surface to a power source, a pivoted lever, means engaging one end of said lever and adapted to engage the cam surface of the clutch, whereby, when said lever is pivoted in one direction, the said means will be moved into position for engagement with the cam surface to move the clutch out of engagement with the power source, a cup member having a closed end positioned on said clutch, a cap telescopically engaging the open end of said cup, an expansible member in said cup to urge the cap into constant engagement with the second end of said lever, said cup, cap and expansible member therein defining a connecting means between the clutch and lever, whereby, when said lever is pivoted in an opposite direction, said lever will move the connecting means against the clutch to move said clutch into engagement with the power source.

14. In a mechanism for connecting a rotating clutch to a power source, a cam on said clutch, an expansible tension member constantly bearing, at one end, on said clutch, and non-rotating movable means constantly engaged and held under tension by the other end of said expansible member, said movable means being movable in one direction against the tension of said expansible member to compress the latter against the clutch, to thus move the clutch into engagement with the power source, and being movable in the opposite direction responsive to the tension of said expansible member, into engagement with the cam, to disengage the clutch from the power source.

15. In a mechanism for connecting and disconnecting a rotatable clutch to a rotating power source, said clutch being in constant engagement with a driven member, a housing disposed in spaced relation to the clutch, a medial, open boss on said housing in registry with the clutch, an expansible means between the driven member and clutch urging the latter away from the former, a member positioned on the clutch and movably disposed in the open boss of the housing, a latch on the housing engaging said member to lock the same in position on the clutch and thus hold the clutch against the tension of said expansible means, and a release unit on the clutch rotatable therewith, said housing latch being disposed in the path of rotation of the release unit and, when engaged thereby, displacing the latch from the member to engage the latter to move in said boss so that the clutch may move responsive to the expansible means away from the power source.

ALBERT RAFTER.

REFERENCES CITED

The following references are of record in the file of this patent:

UNITED STATES PATENTS

| Number | Name | Date |
|---|---|---|
| 787,031 | Girordot | Apr. 11, 1905 |
| 1,265,595 | Biggert | May 7, 1918 |
| 1,367,309 | Dunham | Feb. 1, 1921 |
| 1,649,283 | Bronghton | Nov. 15, 1927 |
| 1,686,584 | Thomas | Oct. 9, 1928 |
| 2,271,359 | Zeruneith | Jan. 27, 1942 |

FOREIGN PATENTS

| Number | Country | Date |
|---|---|---|
| 573,352 | France | June 23, 1924 |